US012462669B2

(12) United States Patent
Chen et al.

(10) Patent No.: US 12,462,669 B2
(45) Date of Patent: Nov. 4, 2025

(54) FIRM ALARM DEVICE HAVING TWO PROCESSORS

(71) Applicant: PixArt Imaging Inc., Hsin-Chu County (TW)

(72) Inventors: Ching-Kun Chen, Hsin-Chu County (TW); Guo-Zhen Wang, Hsin-Chu County (TW)

(73) Assignee: PixArt Imaging Inc., Hsin-Chu County (TW)

( * ) Notice: Subject to any disclaimer, the term of this patent is extended or adjusted under 35 U.S.C. 154(b) by 49 days.

(21) Appl. No.: 18/632,330

(22) Filed: Apr. 11, 2024

(65) Prior Publication Data

US 2024/0257632 A1 Aug. 1, 2024

Related U.S. Application Data

(63) Continuation of application No. 17/878,063, filed on Aug. 1, 2022, now Pat. No. 11,990,024.

(51) Int. Cl.

| | |
|---|---|
| ***G08B 29/20*** | (2006.01) |
| ***G08B 17/103*** | (2006.01) |
| ***G08B 29/18*** | (2006.01) |
| *G08B 25/00* | (2006.01) |

(52) U.S. Cl.

CPC ........... *G08B 29/20* (2013.01); *G08B 17/103* (2013.01); *G08B 29/185* (2013.01); *G08B 25/008* (2013.01)

(58) Field of Classification Search

CPC ...... G08B 29/00; G08B 29/18; G08B 29/183; G08B 29/185; G08B 29/20; G08B 17/06; G08B 17/103; G08B 25/00; G08B 25/008; G05B 1/00; G06T 15/50; G06T 15/506; H05B 47/11; H05B 47/12; A61M 21/00

See application file for complete search history.

(56) References Cited

U.S. PATENT DOCUMENTS 10,744,356 B2 * 8/2020 Livchak .............. F24C 15/2021
10,816,939 B1 * 10/2020 Coleman ................. G01S 17/86
2011/0031419 A1 * 2/2011 Fukui ...................... H03F 3/087 250/574

* cited by examiner

*Primary Examiner* — Van T Trieu
(74) *Attorney, Agent, or Firm* — WPAT, PC

(57) ABSTRACT

There is provided a fire alarm device including multiple light sources, a light sensor, a first processor and a second processor. In a standby mode, the first processor identifies whether to wake up the second processor according to a detection result of the light sensor obtained by detecting emission light of one of the multiple light sources. The second processor identifies whether to generate an alarm according to a detection result of the light sensor obtained by detecting emission light of the multiple light sources. The fire alarm device further includes a thermal sensor for providing detected temperature values to the first processor and/or the second processor to perform the identifying procedure.

20 Claims, 7 Drawing Sheets

FIRM ALARM DEVICE HAVING TWO PROCESSORS

CROSS REFERENCE TO RELATED APPLICATION

The present application is a continuation application of U.S. application Ser. No. 17/878,063, filed on Aug. 1, 2022, now a U.S. Pat. No. 11,990,024, the disclosure of which is hereby incorporated by reference herein in its entirety.

To the extent any amendments, characterizations, or other assertions previously made (in this or in any related patent applications or patents, including any parent, sibling, or child) with respect to any art, prior or otherwise, could be construed as a disclaimer of any subject matter supported by the present disclosure of this application, Applicant hereby rescinds and retracts such disclaimer. Applicant also respectfully submits that any prior art previously considered in any related patent applications or patents, including any parent, sibling, or child, may need to be re-visited.

BACKGROUND

1. Field of the Disclosure

This disclosure generally relates to a fire alarm device and, more particularly, to a fire alarm device that consumes low power so as to extend the standby time and has a low false alarm rate.

2. Description of the Related Art

Most of the house fire alarms are powered by batteries. In addition to low power consumption, the house fire alarm further requires high sensitivity and high reliability.

General commercial available house fire alarms are divided into two types including opto-electronic smoke detectors and constant-temperature thermal sensors based on the working principle thereof. The constant-temperature thermal sensor is triggered while the ambient temperature rises to a predetermined temperature, and has features of high reliability and low sensitivity. The constant-temperature thermal sensor is suitable to be arranged at areas that cause the opto-electronic smoke detector to easily have false alarm such as a kitchen which is an area frequently having smoke.

The opto-electronic smoke detector has high sensitivity such that the function of early warning is achievable. Generally, the opto-electronic smoke detector is required to be able to distinguish the smoke type such that it is possible to reduce a false alarm rate thereof. However, to reduce the false alarm rate, a much more complicated algorithm should be adopted in the opto-electronic smoke detector such that the power consumption thereof is increased at the same time. Therefore, it is not easy to provide an opto-electronic smoke detector fulfilling all requirements such as low power consumption, high sensitivity and high reliability.

Accordingly, the present disclosure provides a multi-stage fire alarm device that can achieve the purpose of low power consumption, high sensitivity and high reliability at the same time by using two processors having different capability.

SUMMARY

The present disclosure provides an opto-electronic type fire alarm device that uses processors having different operating capability in conjunction with different frame rates and different numbers of light sources.

The present disclosure further provides a hybrid fire alarm device that adopts both a thermal sensor and a light sensor.

The present disclosure provides a fire alarm device including a first light source, a second light source, a light sensor, a first processor and a second processor. The first light source is configured to emit light of first wavelength. The second light source is configured to emit light of second wavelength, which is different from the light of first wavelength. The light sensor is configured to detect the light of first wavelength and the light of second wavelength, and respectively generate a first detection signal and a second detection signal. The first processor is configured to identify whether to generate a wakeup signal according to a standby intensity variation of the first detection signal. The second processor is connected to the first processor to receive the wakeup signal, and configured to identify whether to generate a fire alarm according to a first intensity variation of the first detection signal and a second intensity variation of the second detection signal after being woken up by the wakeup signal. The second processor has an operating capability higher than the first processor.

The present disclosure further provides a fire alarm device including a first light source, a second light source, a light sensor, a first processor, a second processor and a thermal sensor. The first light source is configured to emit light of first wavelength. The second light source is configured to emit light of second wavelength, which is different from the light of first wavelength. The light sensor is configured to detect the light of first wavelength and the light of second wavelength, and respectively generate a first detection signal and a second detection signal. The first processor is configured to identify whether to generate a wakeup signal according to a standby intensity variation of the first detection signal. The second processor is connected to the first processor to receive the wakeup signal, and configured to identify whether to generate a fire alarm according to a first intensity variation of the first detection signal and a second intensity variation of the second detection signal after being woken up by the wakeup signal. The thermal sensor is configured to generate temperature values to be provided to at least one of the first processor and the second processor for being used in the identifying. The second processor has an operating capability higher than the first processor.

BRIEF DESCRIPTION OF THE DRAWINGS

Other objects, advantages, and novel features of the present disclosure will become more apparent from the following detailed description when taken in conjunction with the accompanying drawings.

DETAILED DESCRIPTION OF THE EMBODIMENT

It should be noted that, wherever possible, the same reference numbers will be used throughout the drawings to refer to the same or like parts.

One objective of the present disclosure is to provide an opto-electronic type fire alarm device having two processor stages. The front-stage processor is turned on in a standby interval, and has a lower operating capability to calculate the light intensity variation of a single light source emitted at a lower lighting frequency. The rear-stage processor is turned on in identifying whether to give a fire alarm, and has a higher operating capability to calculate the light intensity variation of multiple light sources emitted at a higher lighting frequency. The fire alarm device of the present disclosure is further adopted with a thermal sensor which outputs temperature values for assisting the identification of whether to leave the standby interval and/or give alarm so as to effectively reduce a false alarm rate.

Figure 1:
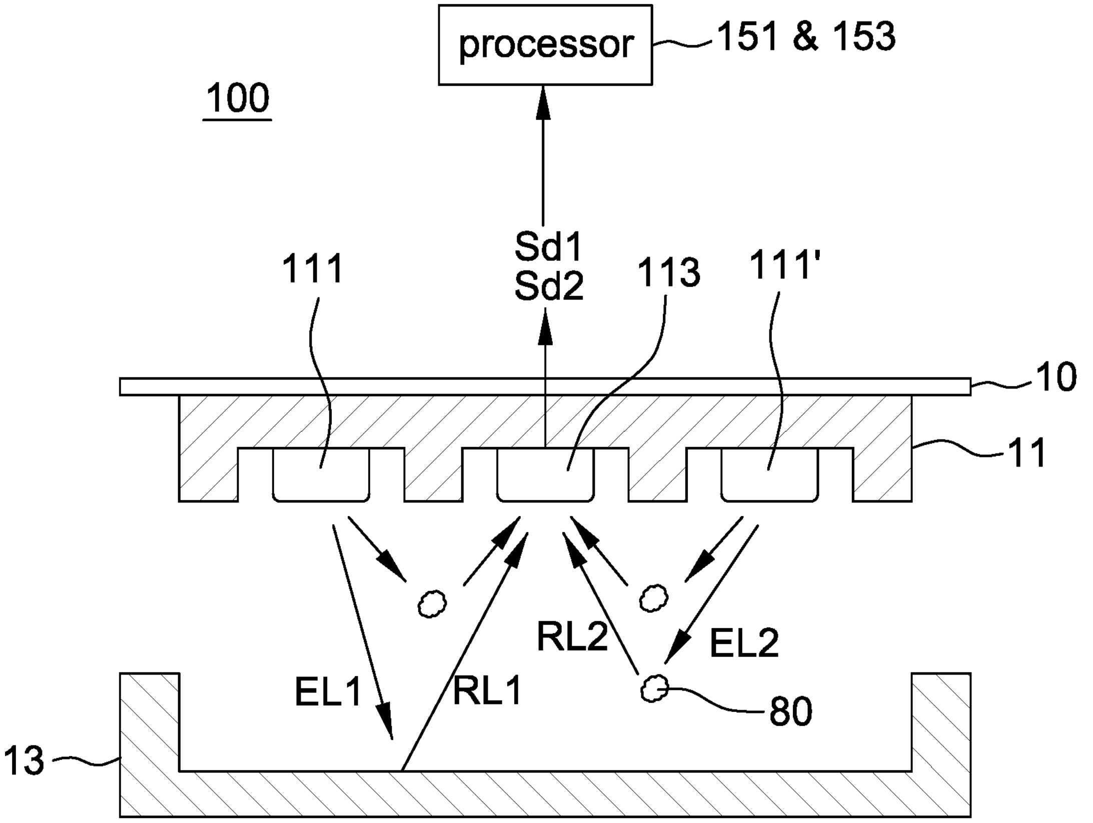
FIG. 1 is a schematic diagram of a fire alarm device according to one embodiment of the present disclosure.

Please refer to FIG. 1, it is a schematic diagram of a fire alarm device 100 according to one embodiment of the present disclosure. The fire alarm device 100 includes a detecting device 11 and a cover 13. The cover 13 has a proper structure without particular limitations, preferably blocking ambient light to enter an inner space thereof and allowing air to enter the inner space. The detecting device 11 includes one or multiple light emitting elements, at least one light detecting element and multiple processors, and is arranged on a bottom surface of a base 10. The detecting device 11 forms a single chip or multiple chips coupled to each other. The base 10 is made from plastic or wood without particular limitations, and is attached to (e.g., using securing member or glue) any suitable position, e.g., a ceiling, a wall or the like.

The one or multiple light emitting elements (LED or LD) are capable of emitting light with different wavelengths, e.g., having totally different wavelength ranges, partially overlapped wavelength ranges, one wavelength range covering the other one wavelength range. In the case that the detecting device 11 includes one light emitting element, driving parameter (e.g., current and/or voltage) of said one light emitting element is adjustable for emitting light of different wavelengths.

Figure 2:
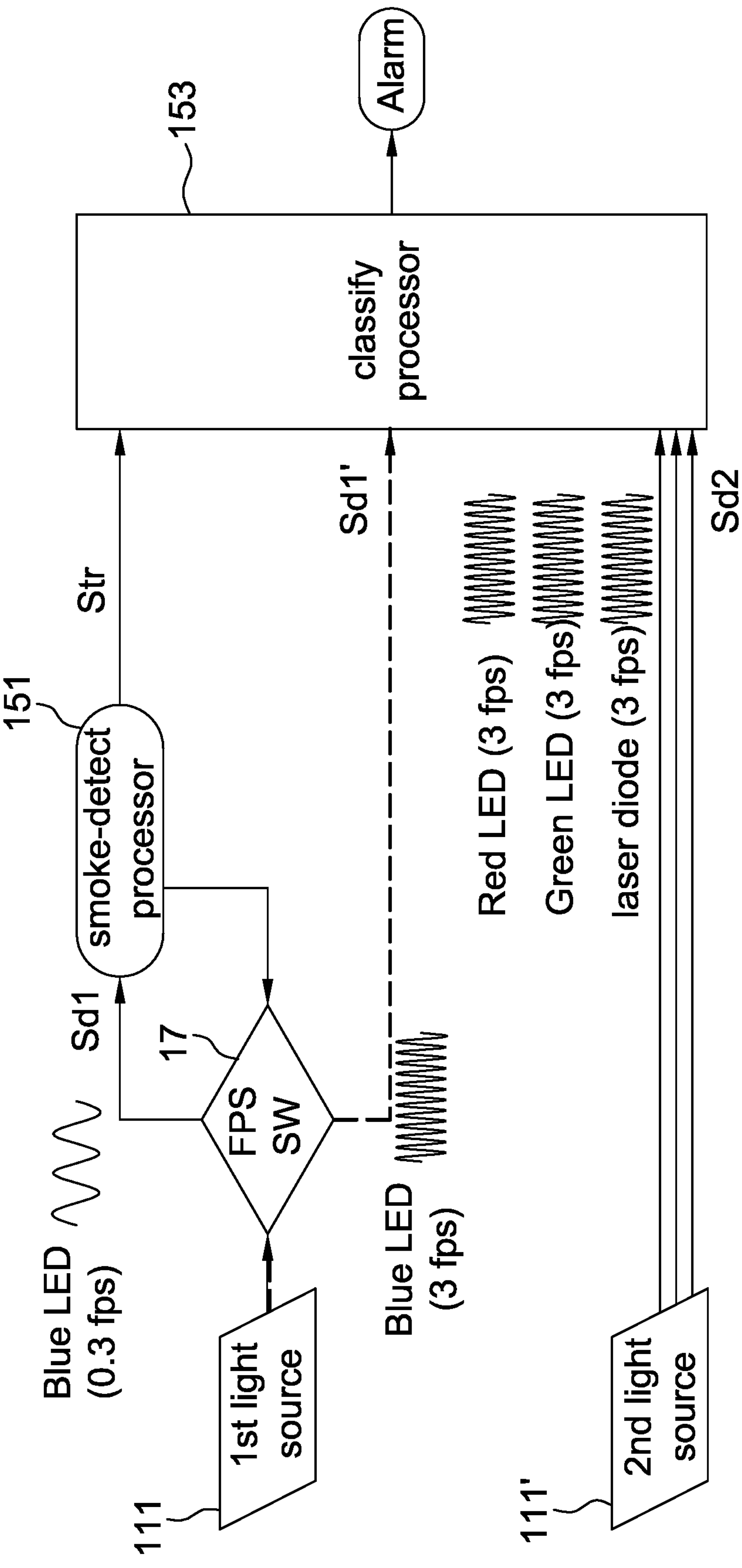
FIG. 2 is a first operational schematic diagram of a fire alarm device according to a first embodiment of the present disclosure.

Please refer to FIGS. 1 and 2 at the same time, FIG. 2 is a first operational schematic diagram of a fire alarm device 100 according to a first embodiment of the present disclosure. The fire alarm device 100 includes a first light source 111, a second light source 111', a light sensor 113, a first processor 151 and a second processor 153. In one aspect, the first light source 111 and the second light source 111' are arranged at opposite sides of the light sensor 113 as shown in FIG. 1, but not limited thereto. In other aspects, the first light source 111 and the second light source 111' are arranged at the same side, e.g., the left side or the right side in FIG. 1, of the light sensor 113.

The first light source 111 emits emission light EL1 having a first wavelength, e.g., blue light emitting diode (LED). The second light source 111' emits emission light EL2 having a second wavelength, different from the first wavelength. The second light source 111' includes, for example, at least one of a red LED, a green LED and a laser diode, but not limited thereto. The laser diode emits light of any wavelength. That is, the second light source 111' is not limited to use a single light source, but includes multiple light sources. If the second light source 111' includes multiple light sources, said multiple light sources are arranged to emit light sequentially or simultaneously. All of said multiple light sources area arranged at the same side as or opposite side to the first light source 111, or a part of said multiple light sources is arranged at the same side as the first light source 111 and the other part of said multiple light sources is arranged at the opposite side to the first light source 111 without particular limitations.

As shown in FIG. 1, the emission light EL1 and EL2 are reflected to the light sensor 113 by an inner surface of the cover 13 and smoke 80.

The light sensor 113 includes, for example, a CMOS image sensor, a SPAD sensor or a sensor adopting organic photoconductive films. The light sensor 113 detects reflection light RL1 of the light of first wavelength and reflection light RL2 of the light of second wavelength to respectively generate a first detection signal Sd1 and a second detection signal Sd2, wherein the first detection signal Sd1 reflects a light intensity variation of the light of first wavelength, and the second detection signal Sd2 reflects a light intensity variation of the light of second wavelength.

The first processor 151 identifies whether to generate a wakeup signal Str according to the first detection signal Sd1, e.g., identifying whether to generate the wakeup signal Str according to a standby intensity variation of the first detection signal Sd1 outputted by the light sensor 113. The first processor 151 processes a light signal only associated with the first light source 111, and thus the first processor 151 selects a processor having low operating capability, e.g., fixed point processor. When the first processor 151 operates alone (e.g., the second processor 153 sleeping and before the wakeup signal Str is generated), the fire alarm device 100 is under a standby state or a low power state. After the first processor 151 generates the wakeup signal Str, the fire alarm device 100 enters a pre-alarm state. In other words, the first processor 151 does not directly control the fire alarm device 100 to generate a fire alarm using the wakeup signal Str, and the fire alarm is triggered only in the pre-alarm state.

In the standby mode, the second light source 111' is not lighted and the first light source 111 emits light of first wavelength at a first frequency (e.g., shown as 0.3 fps, i.e. lighting once per 3 seconds, but not limited to). Meanwhile, the light sensor 113 captures the light of first wavelength at a first frame rate (e.g., 0.3 fps, but not limited to). Preferably, the frame rate of the light sensor 113 is synchronous to the lighting frequency of the first light source 111.

Figure 7:
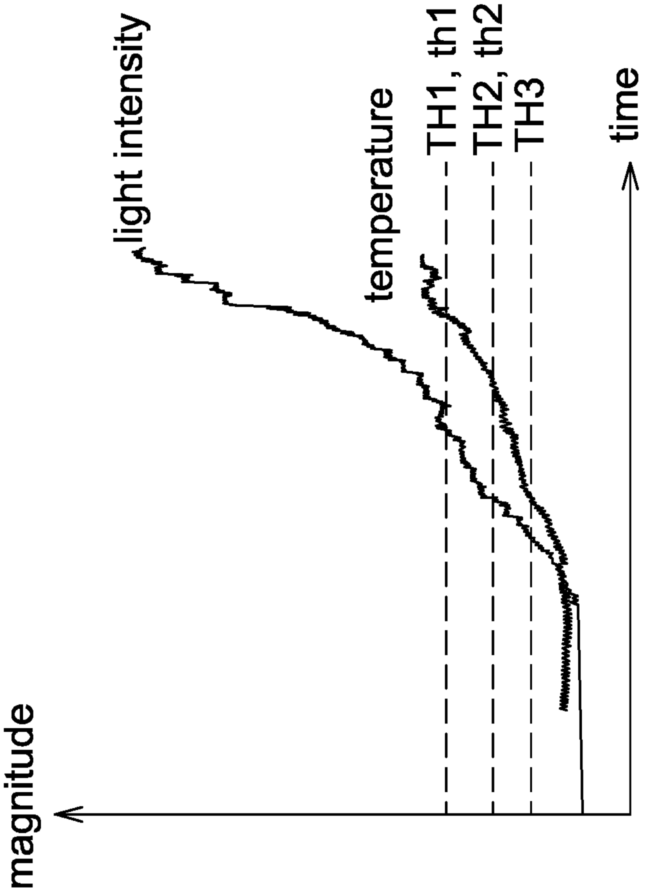
FIG. 7 is a schematic diagram of a light intensity variation, a temperature variation and thresholds of a fire alarm device according to a second embodiment of the present disclosure.

In one aspect, the first processor 151 compares a slope and/or magnitude of the standby intensity variation of the light of first wavelength with a historical record to identify whether to generate the wakeup signal Str, wherein the historical record is recorded in, for example, a memory of the fire alarm device 100. The historical record indicates a light intensity variation and/or average of the light of first wavelength without fire event. For example, when the slope of the standby intensity variation of the light of first wavelength exceeds a predetermined slope threshold and/or a standby intensity of the light of first wavelength exceeds an intensity threshold (e.g., TH3 shown in FIG. 7), it means that the environment condition is possibly changing (e.g., having smoke), and the first processor 151 sends the wakeup signal Str to the second processor 153.

After being woken up by the wakeup signal Str, the second processor 153 identifies whether to generate a fire alarm according to a first intensity variation of the light of first wavelength and a second intensity variation of the light of second wavelength. In the present disclosure, after the first processor 151 generates the wakeup signal Str, the first light source 111 is changed to emits light of first wavelength at a second frequency (e.g., shown as 3 fps, i.e. lighting 3 times per second, but not limited to), higher than the first frequency. For example, the fire alarm device 100 further includes a frame rate switch (e.g., shown as FPS SW), which is arranged in the first processor 151 for instance, for changing a lighting frequency of the first light source 111 and a frame rate of the light sensor 113. Meanwhile, the first processor 151 further sends another wakeup signal (identical to or different from Str) to cause the second light source 111' to emit light of second wavelength at the second frequency.

In the present disclosure, before the first processor 151 sends the wakeup signal Str, the second light source 111' is not lighted. Thus, the second light source 111' is not arranged to emit the light of second wavelength at the first frequency. More specifically, the above embodiments are described in assuming that wavelength ranges of the first light source 111 and the second light source 111' are not overlapped. If a wavelength range of the second light source 111' is partially overlapped with a wavelength range of the first light source 111, a partial wavelength range of the second light source 111' not overlapped with the wavelength range of the first light source 111 is not lighted before the wakeup signal Str is generated.

Because the second processor 153 processes high frequency light signals of multiple light sources (e.g., the first light source 111 and the second light source 111'), the second processor 153 preferably adopts a processor having high operating capability, e.g., a floating point processor. Meanwhile, corresponding to the emission frequencies of the first light source 111 and the second light source 111', the light sensor 113 acquires the light of first wavelength and the light of second wavelength at a second frame rate (e.g., 3 fps, but not limited to), higher than the first frame rate, after the first processor 111 generates the wakeup signal Str. The first light source 111 and the second light source 111' emit light, for example, alternatively.

The second processor 153 then recognizes a type of smoke source using an embedded algorithm, e.g., including the paper fire, wood fire, foam fire or the like so as to identify whether to give an alarm. The method of distinguishing smoke types according to detection signals associated with multiple light sources may be referred to U.S. patent application Ser. No. 17/320,222, entitled "SMOKE DETECTOR" filed on May 14, 2021, assigned to the same assignee of the present application, and the full disclosure of which is incorporated herein by reference.

For example, the second processor 153 distinguishes smoke 80 and floating particles according to a similarity of detection signals of different colors of light, but not limited to. For example, the second processor 153 is embedded with a classification algorithm which is constructed by category learning the detection signals of different colors of light to distinguish smoke 80 and floating particles. For example, the fire alarm is not given when the light intensity variation is identified to be caused by floating particles.

As shown in FIG. 2, after the first processor 151 generates the wakeup signal Str to cause the second processor 153 to categorize smoke types according to the first detection signal Sd1' and the second detection signal Sd2, the first processor 151 enters a sleeping mode.

Figure 3:
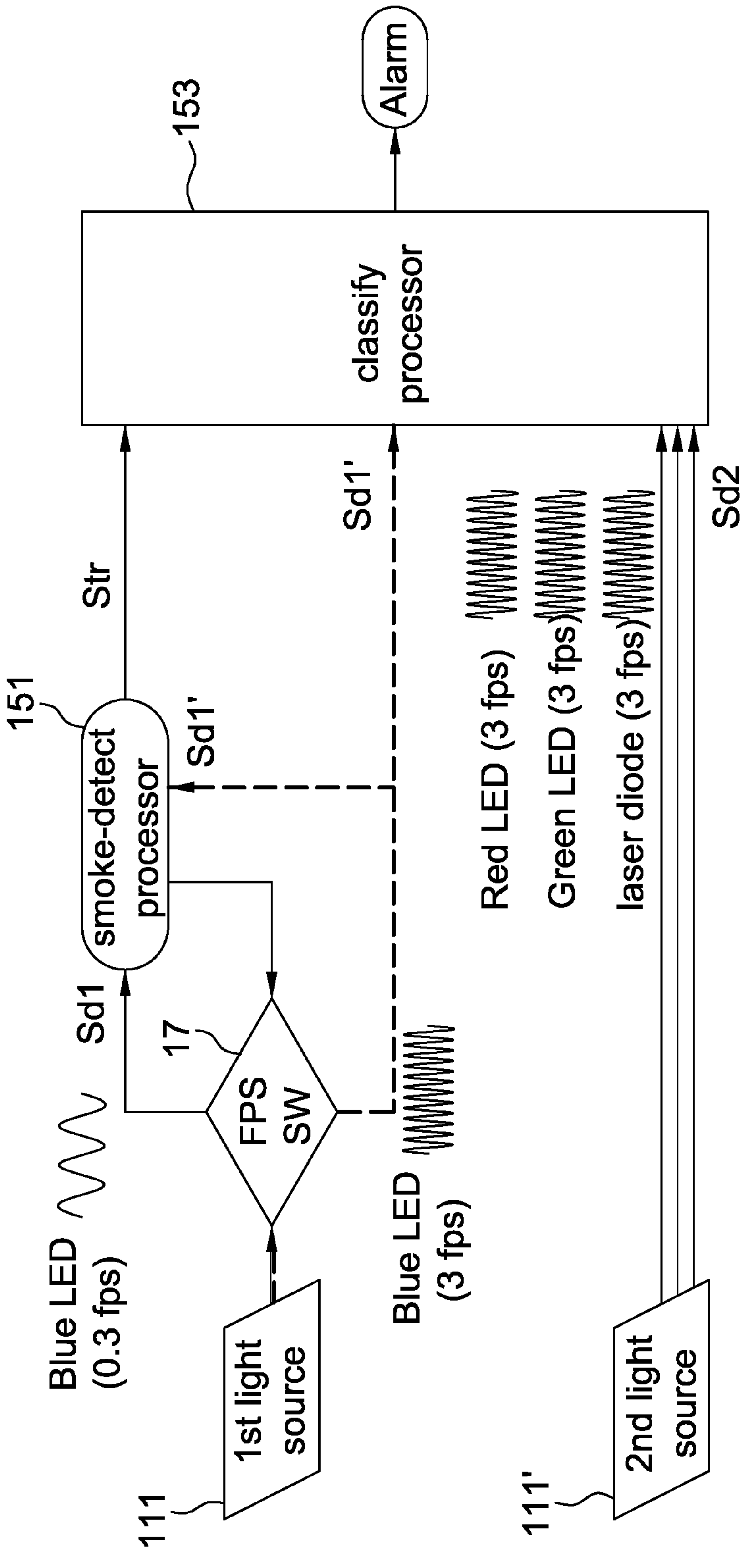
FIG. 3 is a second operational schematic diagram of a fire alarm device according to a first embodiment of the present disclosure.

As shown in FIG. 3, it is a second operational schematic diagram of a fire alarm device 100 according to a first embodiment of the present disclosure. In another aspect, after the second processor 153 is woken up by the wakeup signal Str, the first processor 151 continuously records a first intensity variation of the first detection signal Sd1' associated with the light of first wavelength (higher frequency) as a reference of identifying whether to generate the wakeup signal Str next time and as a reference for signal calibration, e.g., calibrating the detection signals corresponding to environmental temperature fluctuation. For example, if the second processor 153 identifies that an alarm is not required (i.e. no smoke), the fire alarm device 100 returns to the standby state, and the first intensity variation of the first detection signal Sd1' recorded within the pre-alarm interval (i.e., the standby state being left and before the alarm being given) is recorded into the memory as a part of the historical record.

Figure 4:
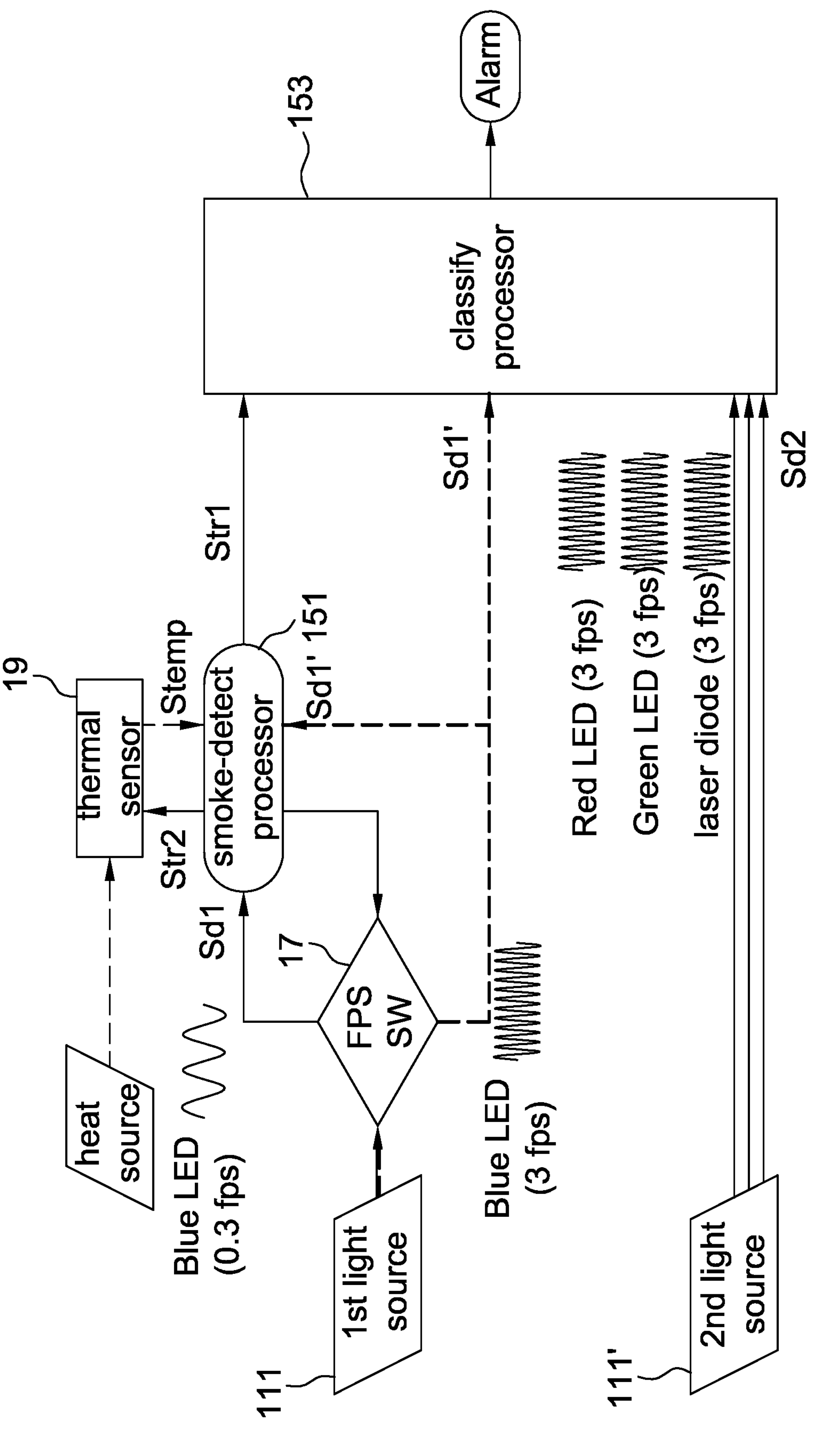
FIG. 4 is a first operational schematic diagram of a fire alarm device according to a second embodiment of the present disclosure.
Figure 5:
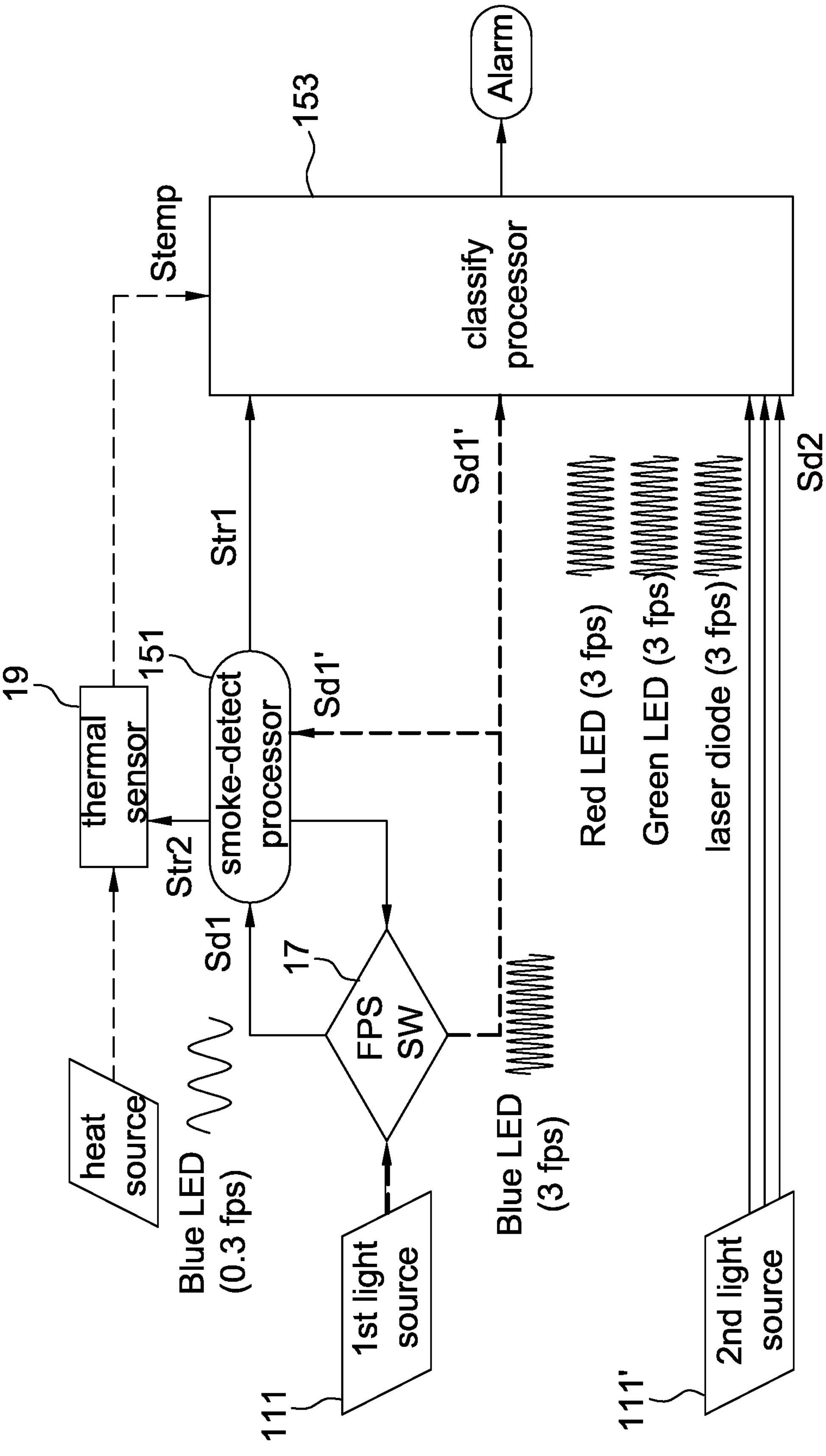
FIG. 5 is a second operational schematic diagram of a fire alarm device according to a second embodiment of the present disclosure.
Figure 6:
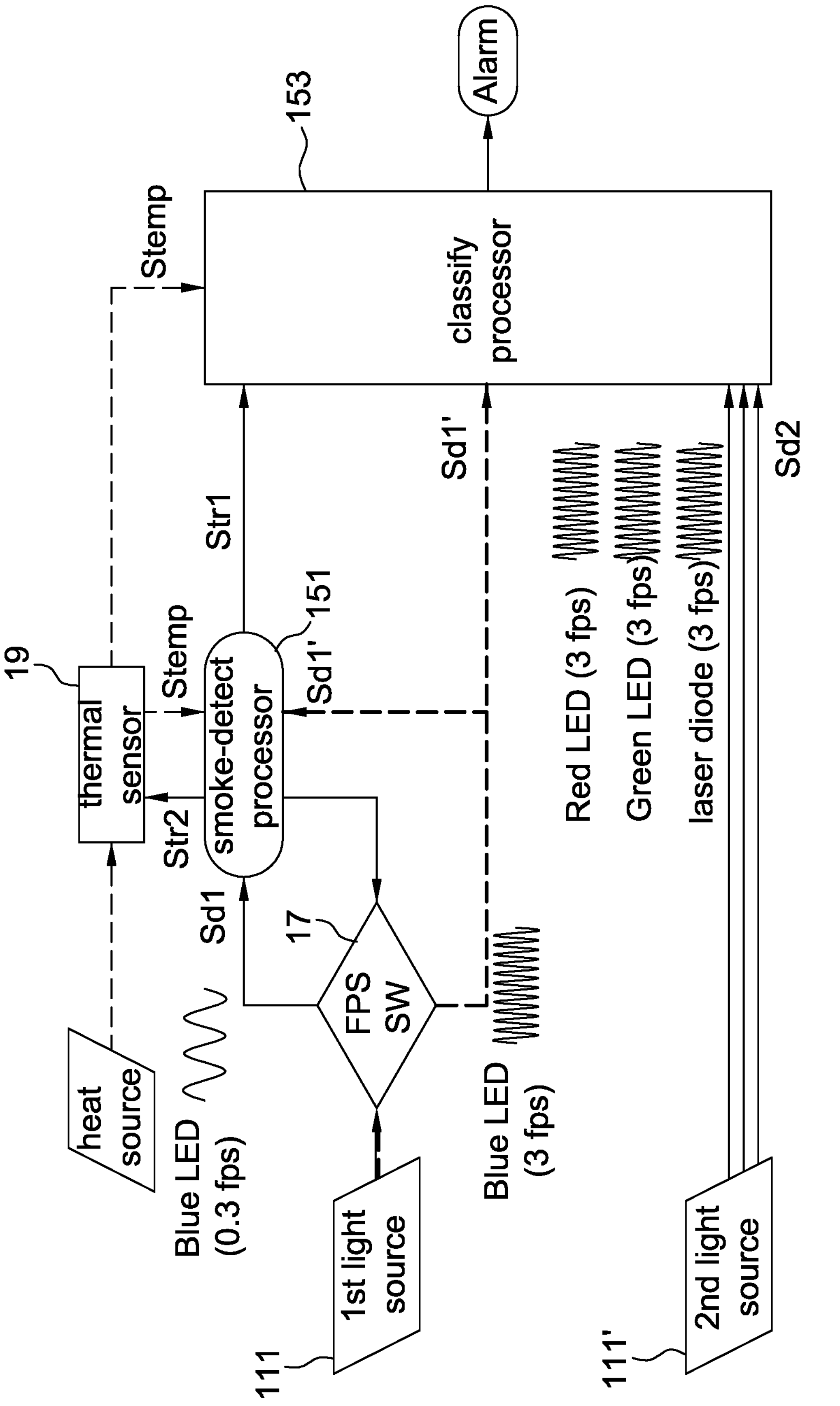
FIG. 6 is a third operational schematic diagram of a fire alarm device according to a second embodiment of the present disclosure.

For further reducing the false alarm rate, the fire alarm device 100 of the present disclosure further includes a thermal sensor 19, referring to FIGS. 4 to 6. That is, the fire alarm device 100 includes a first light source 111, a second light source 111', a light sensor 113, a first processor 151 and a second processor 153 as the first embodiment, which have being illustrated above and thus are not repeated herein. The fire alarm device 100 of the second embodiment of the present disclosure further includes a thermal sensor 19 for generating temperature values Stemp to be provided to at least one of the first processor 151 and the second processor 152, and to be used in the identifying procedure, e.g., comparing the variation slope or magnitude of the temperature values Stemp with a predetermined threshold to identify whether the environment condition has a change.

For example referring to FIG. 4, the temperature values Stemp outputted by the thermal sensor 19 is provided only to the first processor 151 for identifying whether to generate a wakeup signal Str1, wherein Str1 is identical to or different from Str mentioned above as long as the second processor 153 can be woken up.

In one aspect, when a variation slope of the temperature values Stemp is larger than a first slope threshold or a standby intensity variation of the first detection signal Sd1 (i.e. light intensity associated with the first frequency) is larger than a first variation threshold, the first processor 151 generates the wakeup signal Str1. Please refer to FIG. 7 together, or when the magnitude of the temperature values Stemp is larger than a first temperature threshold th1 or the standby light intensity of the first detection signal Sd1 is larger than a first intensity threshold TH1, the first processor 151 generates the wakeup signal Str1.

In another aspect, when a variation slope of the temperature values Stemp is larger than a second slope threshold, which is smaller than the first slope threshold, or a standby intensity variation of the first detection signal Sd1 is larger than a second variation threshold, which is smaller than the first variation threshold, the first processor 151 generates the wakeup signal Str1. Please refer to FIG. 7 again, or when the magnitude of the temperature values Stemp is larger than a second temperature threshold th2, which is smaller than the first temperature threshold th1, or the standby light intensity of the first detection signal Sd1 is larger than a second intensity threshold TH2, which is smaller than the first intensity threshold TH1, the first processor 151 generates the wakeup signal Str1.

In one aspect, the thermal sensor 19 and the first processor 151 are turned on at the same time (e.g., while a battery being arranged for providing electricity to the fire alarm device 100). Or, to reduce the power consumption, the thermal sensor 19 is turned on after the standby intensity variation of the light of first wavelength is larger than a third variation threshold, which is smaller than the second variation threshold. Please refer to FIG. 7 again, or when the standby light intensity of the light of first wavelength is larger than a third intensity threshold TH3, which is smaller than the second intensity threshold TH2, the thermal sensor 19 is turned on. That is, the first processor 151 sends the wakeup signal Str2 at first to wake up the thermal sensor 19, and then the first processor 19 identifies whether to send the wakeup signal Str1 according to the temperature values Stemp and the first detection signal Sd1.

Similarly, the fire alarm device 100 is arranged in the way that the thermal sensor 19 stops recording temperature values Stemp and the first processor 151 is turned off after the wakeup signal Str1 is generated to reduce power consumption.

In another aspect, the fire alarm device 100 is arranged in the way that the thermal sensor 19 continuously records the temperature values Stemp (e.g., in the memory of the fire alarm device 100) and the first processor 151 continuously records the first intensity variation of the light of first wavelength (i.e. associated with light intensity of second frequency) detected by the light sensor 113 after the wakeup signal Str1 is generated as a reference of identifying whether to output the wakeup signal Str1 next time or as a reference for signal calibration.

Please refer to FIG. 5, in an alternative embodiment, the temperature values Stemp outputted by the thermal sensor 19 is only provided to the second processor 153 for identifying whether to generate the fire alarm. That is, the first processor 151 identifies whether to send the wakeup signal Str1 to the second processor 153 simply according to the first detection signal Sd1. Therefore, in another aspect, the thermal sensor 19 is woken up by the wakeup signal Str2, which is identical to or different from Str1.

Similarly, the thermal sensor 19 is turned on together with the first processor 151 (e.g., while a battery being arranged for providing electricity to the fire alarm device 100) so as to record (e.g., in the memory) the temperature values Stemp before the wakeup signal Str1 is generated for the second processor 153 to identify whether to generate the fire alarm, e.g., by comparing current temperature with historical record.

Please refer to FIG. 6, in a further alternative embodiment, the temperature values Stemp outputted by the thermal sensor 19 are provided to the first processor 151 for identifying whether to generate the wakeup signal Stre1 and to the second processor 153 for identifying whether to generate the fire alarm. Similarly, the thermal sensor 19 is arranged to be woken up together with the first processor 151 or woken up by a wakeup signal Str2, wherein Str2 is identical to or different from Str1. The wakeup signal Str2 is generated, for example, when the standby light intensity of the first detection signal Sd1 is larger than a third intensity threshold TH3.

In the present disclosure, because the first processor 151 is used to monitor whether there is smoke being generated, the first processor 151 is shown as a smoke-detect processor in FIGS. 2 to 6 to indicate the function thereof; meanwhile, because the second processor 153 is used to identify the smoke type, the second processor 153 is shown as a classify processor in FIGS. 2 to 6 to indicate the function thereof. The first processor 151 and the second processor 153 are both selected from a microprocessor unit (MCU), a digital signal processor (DSP), a field programmable gate array (FPGA) or an application specific integrated circuit (ASIC), but have different operating capabilities.

In the present disclosure, the standby intensity variation is referred to an intensity variation of the light of first wavelength before the second processor 153 is woken up, and the first intensity variation is referred to an intensity variation of the light of first wavelength after the second processor 153 is woken up.

In the present disclosure, an emission frequency of a light source is referred to a number of times being lighted within a predetermined time interval.

In the present disclosure, the light of first wavelength includes the emission light EL1 and the reflection light RL1, and the light of second wavelength includes the emission light EL2 and the reflection light RL2 as shown in FIG. 1.

In the present disclosure, the first detection signal Sd1 is a detection signal associated with the light of first wavelength emitted at a first frequency, and the first detection signal Sd1' is a detection signal associated with the light of first wavelength emitted at a second frequency.

In the present disclosure, the fire alarm being trigger is referred to sound, vibration, light or the like is generated by a corresponding device.

It should be mentioned that values (e.g., frequency and frame rate) and colors of light (e.g., red, green, blue) mentioned above are only intended to illustrate but not to limit the present disclosure.

It should be mentioned that although FIGS. 4 to 6 show that the first processor 151 is not turned off after the second processor 153 is woken up, the present disclosure is not limited thereto. Similar to FIG. 2, in another aspect, the first processor 151 is turned off after the second processor 153 is woken up so as to reduce power consumption.

As mentioned above, it is not easy to achieve all requirements of an opto-electronic smoke detector. Accordingly, the present disclosure further provides a multi-stage fire alarm device (e.g., FIG. 1) and an operating method thereof (referring to FIGS. 2 to 6) that use a processor having lower operating capability in a standby phase to process a single light source signal having a lower frame rate. Next, after the appearance of smoke is confirmed, a processor having higher operating capability is woken up to process multiple light source signals having a higher frame rate so as to achieve all purposes of long standby interval, high sensitivity and high reliability.

Although the disclosure has been explained in relation to its preferred embodiment, it is not used to limit the disclosure. It is to be understood that many other possible modifications and variations can be made by those skilled in the art without departing from the spirit and scope of the disclosure as hereinafter claimed.

What is claimed is:

1. A fire alarm device, comprising:

a first light source, configured to emit light of first wavelength;

a second light source, configured to emit light of second wavelength, which is different from the light of first wavelength;

a light sensor, configured to detect the light of first wavelength and the light of second wavelength, and respectively generate a first detection signal and a second detection signal;

a first processor, configured to identify whether to generate a wakeup signal according to a standby intensity variation of the first detection signal; and a second processor, connected to the first processor to receive the wakeup signal, and configured to identify whether to generate a fire alarm according to a first intensity variation of the first detection signal and a second intensity variation of the second detection signal after being woken up by the wakeup signal, wherein the second processor has an operating capability higher than the first processor.

2. The fire alarm device as claimed in claim 1, wherein the second light source does not emit light before the first processor generates the wakeup signal.

3. The fire alarm device as claimed in claim 1, wherein the first light source is configured to emit the light of first wavelength at a first frequency before the first processor generates the wakeup signal, and the first light source is configured to emit the light of first wavelength at a second frequency, higher than the first frequency, after the first processor generates the wakeup signal.

4. The fire alarm device as claimed in claim 3, wherein the second light source is configured to emit the light of second wavelength at the second frequency without at the first frequency.

5. The fire alarm device as claimed in claim 1, wherein the first processor is a fixed point processor, and the second processor is a floating point processor, and the second processor is sleeping before the wakeup signal is generated.

6. The fire alarm device as claimed in claim 1, wherein the first processor is turned off after the second processor is woken up by the wakeup signal.

7. The fire alarm device as claimed in claim 1, wherein after the second processor is woken up by the wakeup signal, the first processor is configured to continuously record the first intensity variation of the first detection signal as a reference of identifying whether to generate the wakeup signal next time and a reference for signal calibration.

8. The fire alarm device as claimed in claim 1, wherein the first processor is configured to identify whether to generate the wakeup signal by comparing a slope of the standby intensity variation of the first detection signal with a historical record.

9. The fire alarm device as claimed in claim 1, wherein the first light source is a blue light emitting diode, and the second light source comprises at least one of a red light emitting diode, a green light emitting diode and a laser diode.

10. The fire alarm device as claimed in claim 1, wherein the light sensor is configured to capture the light of first wavelength at a first frame rate before the first processor generates the wakeup signal, and the light sensor is configured to capture the light of first wavelength and the light of second wavelength at a second frame rate, higher than the first frame rate, after the first processor generates the wakeup signal.

11. A fire alarm device, comprising:

a first light source, configured to emit light of first wavelength;

a second light source, configured to emit light of second wavelength, which is different from the light of first wavelength;

a light sensor, configured to detect the light of first wavelength and the light of second wavelength, and respectively generate a first detection signal and a second detection signal;

a first processor, configured to identify whether to generate a wakeup signal according to a standby intensity variation of the first detection signal;

a second processor, connected to the first processor to receive the wakeup signal, and configured to identify whether to generate a fire alarm according to a first intensity variation of the first detection signal and a second intensity variation of the second detection signal after being woken up by the wakeup signal; and a thermal sensor, configured to generate temperature values to be provided to at least one of the first processor and the second processor for being used in the identifying, wherein the second processor has an operating capability higher than the first processor.

12. The fire alarm device as claimed in claim 11, wherein the temperature values of the thermal sensor are only provided to the first processor for identifying whether to generate the wakeup signal, the first processor is configured to generate the wakeup signal when a variation slope of the temperature values is larger than a first slope threshold or the standby intensity variation of the first detection signal is larger than a first variation threshold, and the first processor is configured to generate the wakeup signal when the variation slope of the temperature values is larger than a second slope threshold, smaller than the first slope threshold, and the standby intensity variation of the first detection signal is larger than a second variation threshold, smaller than the first variation threshold.

13. The fire alarm device as claimed in claim 12, wherein the thermal sensor is turned on together with the first processor, or the thermal sensor is turned on after the standby intensity variation of the first detection signal is larger than a third variation threshold, smaller than the second variation threshold.

14. The fire alarm device as claimed in claim 12, wherein after the wakeup signal is generated, the thermal sensor stops recording the temperature values and the first processor is turned off.

15. The fire alarm device as claimed in claim 12, wherein after the wakeup signal is generated, the thermal sensor continuously records the temperature values and the first processor continuously records the first intensity variation of the first detection signal as a reference of identifying whether to generate the wakeup signal next time or a reference for signal calibration.

16. The fire alarm device as claimed in claim 11, wherein the temperature values of the thermal sensor are only provided to the second processor for identifying whether to generate the fire alarm, and the thermal sensor is also woken up by the wakeup signal.

17. The fire alarm device as claimed in claim 11, wherein the temperature values are only provided to the second processor for identifying whether to generate the fire alarm, and the thermal sensor is turned on together with the first processor to record the temperature values before the wakeup signal is generated.

18. The fire alarm device as claimed in claim 11, wherein the temperature values of the thermal sensor are provided to the first processor for identifying whether to generate the wakeup signal and to the second processor for identifying whether to generate the fire alarm, and the thermal sensor is turned on together with the first processor, or turned on by the first processor using another wakeup signal.

19. The fire alarm device as claimed in claim 11, wherein the light sensor is configured to capture the light of first wavelength at a first frame rate before the first processor generates the wakeup signal, and the light sensor is configured to capture the light of first wavelength and the light of second wavelength at a second frame rate, higher than the first frame rate, after the first processor generates the wakeup signal.

20. The fire alarm device as claimed in claim 11, wherein the first processor is a fixed point processor, and the second processor is a floating point processor, and the first light source is configured to emit the light of first wavelength at a first frequency before the first processor generates the wakeup signal, and the first light source is configured to emit the light of first wavelength at a second frequency, higher than the first frequency, after the first processor generates the wakeup signal.

* * * * *